United States Patent
De Haan et al.

(10) Patent No.: US 6,618,094 B1
(45) Date of Patent: Sep. 9, 2003

(54) DE-INTERLACING IMAGE SIGNALS

(75) Inventors: Gerard De Haan, Eindhoven (NL); Erwin Ben Bellers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/575,604

(22) Filed: May 22, 2000

(30) Foreign Application Priority Data

May 25, 1999 (EP) .............................................. 99201641

(51) Int. Cl.$^7$ ................................................ H04N 11/20
(52) U.S. Cl. ....................................... 348/448; 348/452
(58) Field of Search ................................ 348/448, 452, 348/700

(56) References Cited

U.S. PATENT DOCUMENTS 5,305,104 A * 4/1994 Jensen et al. ................ 348/473
6,181,382 B1 * 1/2001 Kieu et al. ................... 348/459
6,269,484 B1 * 7/2001 Simsic et al. ................ 725/151
6,452,639 B1 * 9/2002 Wagner et al. .............. 348/448

OTHER PUBLICATIONS

"Prolog to Deinterlacing ※ an Overview" An introduction to the paper by Gerard De Haan and Erwin B. Bellers in Proceedings of the IEEE, vol. 86, No. 9, Sep. 1998, pp. 1837 ※ 1856.

* cited by examiner

Primary Examiner—Victor R. Kostak
(74) Attorney, Agent, or Firm—Edward W. Goodman

(57) ABSTRACT

In a method of de-interlacing video data (F), at least three different de-interlacing algorithms (VTF, MED1, CM3) are applied on the video data (F) to obtain at least three de-interlaced signals (DIO-1, DIO-2, DIO-3), no majority of de-interlacing algorithms copying a single spatio-temporally neighboring pixel (A, B, C, D) to the interpolated position (E), and the at least three de-interlaced signals (DIO-1, DIO-2, DIO-3) are order statistical filtered (MED2) to obtain an output signal (E).

9 Claims, 1 Drawing Sheet

DE-INTERLACING IMAGE SIGNALS

BACKGROUND OF THE INVENTION

1. Field of the Invention

The invention relates to a method and device for de-interlacing image signals, and to a display apparatus comprising such a de-interlacing device.

2. Description of the Related Art

De-interlacing is a basic requirement for practically all video scanning format conversions. Since perfection under all circumstances is impossible to achieve, many different algorithms have been proposed, ranging from simple spatial de-interlacing methods to the advanced motion compensated (MC) ones.

Many of the non-MC de-interlacing algorithms perform reasonably well on a limited set of sequences, but can suffer from annoying artifacts on another type of sequences. A nice overview is presented in Ref. [2] in the List Of References. For example, the field insertion algorithm is the best de-interlacer for stationary image parts, but is the worst for non-stationary image parts. Motion compensation can provide better results on moving images, but the algorithm remains very fragile, i.e., the performance degrades rapidly to unacceptable levels if the motion compensation is not completely correct. A de-interlacer that can better cope with both stationarities and non-stationarities is the vertical-temporal median filter. This median filter de-interlacer inherently switches between field insertion and line repetition. However, due to its non-linear nature, it introduces harmonics (and therefore alias) in image parts containing vertically high frequencies. The vertical-temporal linear filter, as also commercialized by Genesis (See Ref. [1]), is better suited for sequences containing vertical high frequencies, but will not preserve edges as well as the median, while moving details may cause echoes in the image. In the literature, some proposals have been presented that explicitly switch or fade between multiple algorithms (see also Refs. [3]–[6]). The decision between the different algorithms is either determined by motion detection or edge detection. A very reliable detector is, however, difficult to design, as also mentioned in Ref. [2]. A more robust alternative would provide an attractive option.

SUMMARY OF THE INVENTION

It is, inter alia, an object of the invention to provide an improved de-interlacing. To this end, the invention provides a de-interlacing method and device, as well as a display apparatus incorporating such a device.

In a method of de-interlacing video data in accordance with a primary aspect of the present invention, at least three different de-interlacing algorithms are applied on the video data to obtain at least three de-interlaced signals, no majority of de-interlacing algorithms copying a single spatio-temporally neighboring pixel to the interpolated position, and the at least three de-interlaced signals are order statistical filtered to obtain an output signal.

These and other aspects of the invention will be apparent from and elucidated with reference to the embodiments described hereinafter.

DESCRIPTION OF THE PREFERRED EMBODIMENT

The current invention provides the required robust alternative. In a preferred embodiment, the current invention uses a set of (simple) de-interlacing algorithms, which is chosen such that a majority of the algorithms has a certain strength, e.g., robustness, another majority has a strength in e.g., edge preservation, and a third majority is strong in e.g., detail preservation. Although none of these algorithms is good in all aspects, the output of a median filter that selects between these alternatives is, simply because the majority wins. Unique in this new design is the fact that motion vectors can be applied to improve its performance, even if the reliability of these vectors is very poor. In case no vectors are being used, the method outperforms all known non-motion compensated methods. Next generation Trimedia will be designed to support this algorithm.

In a first embodiment, the output of the de-interlacer is defined by:

$$F_0(\vec{x}, n) = \begin{cases} F(\vec{x}, n), & (y\bmod 2 = n\bmod 2) \\ MED\{D, MED\{B, A, C\}, F_{VT}(\vec{x}, n)\}, & \text{(otherwise)} \end{cases} \quad (1)$$

with $$\vec{x} = \begin{pmatrix} x \\ y \end{pmatrix}$$

the spatial position, n the field number, $F(\vec{x}, n)$ the input field defined for 'y mod 2=n mod 2' only, $$\vec{u}_Y = \begin{pmatrix} 0 \\ 1 \end{pmatrix}$$

the vertical unity vector, and A, B, C and D defined by (see also FIG. 1):

$$A = F(\vec{x}, n+1) \quad (2)$$
$$B = F(\vec{x} - \vec{u}_Y, n)$$
$$C = F(\vec{x} + \vec{u}_Y, n)$$
$$D = F(\vec{x}, n-1)$$

Figure 1:
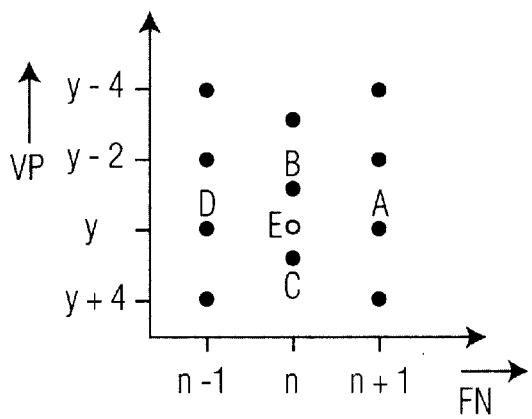
FIG. 1 illustrates the aperture of a three field de-interlacer.

FIG. 1 illustrates the aperture of a three field de-interlacer. The vertical position VP is indicated on the vertical axis, while the field number FN is indicated on the horizontal axis. The black dots A–D indicate original samples, while the open circle E indicates an interpolated sample to be obtained in accordance with the lower expressions in formulae 1, 6 or 7.

The median filter operator MED(A, B, C) is defined by:

$$MED\{A, B, C\} = \begin{cases} A, & (B\langle A\langle C) \vee (C\langle A\langle B) \\ B, & (A \le B \le C) \vee (C \le B \le A) \\ C, & \text{(otherwise)} \end{cases} \quad (3)$$

The output of the vertical-temporal filter $F_{VT}$ is defined by:

$$F_{VT}(\vec{x}, n) = \begin{cases} F(\vec{x}, n) & (y \bmod 2 = n \bmod 2) \\ \sum_m \sum_k F(\vec{x} + k\vec{u}_Y, n + m)h(k, m), & \text{(otherwise)} \end{cases} \quad (4)$$

with (k,m∈Z, (k+m)mod 2=1)∧(|Max(k)|>0)∧(|Max(m)|>0).

The Max(x) operator determines the maximum value of the variable x. In our experiments, the vertical-temporal filter was defined by:

$$18h(k, m) = \begin{cases} 1, 8, 8, 1, & (k = -3, -1, 1, 3) \wedge (m = 0) \\ -5, 10, -5, & (k = -2, 0, 2) \wedge (m = -1) \\ 0, & \text{(otherwise)} \end{cases} \quad (5)$$

Figure 3:
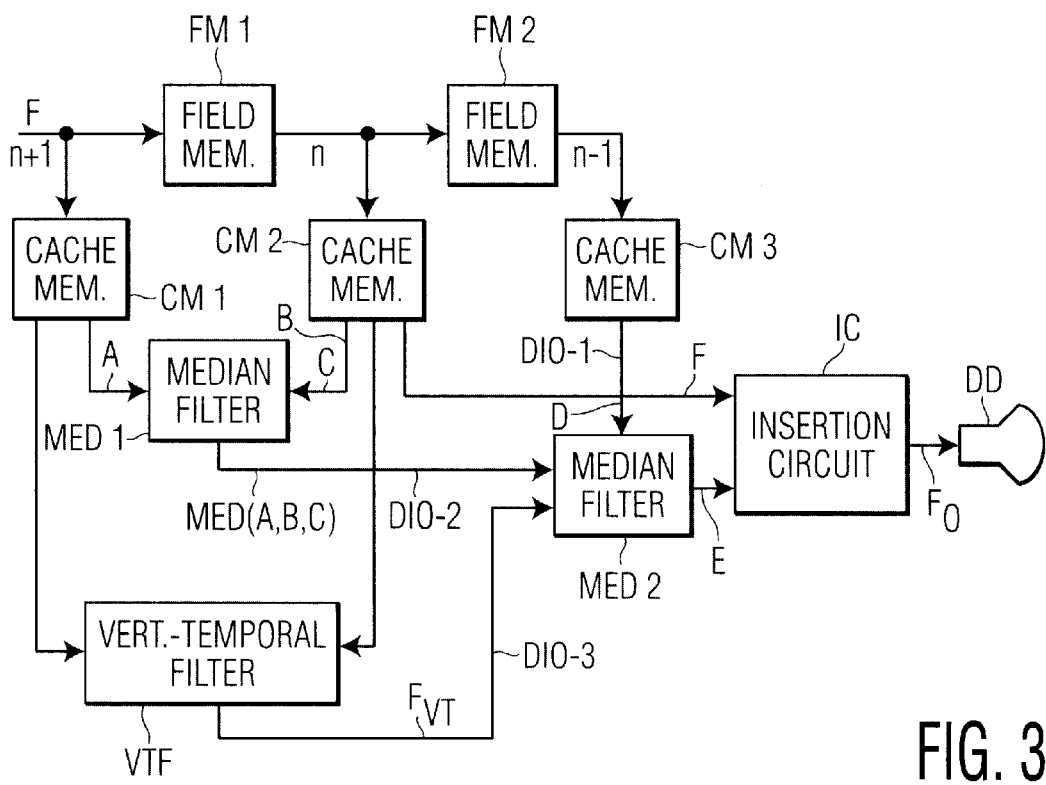
FIG. 3 shows a preferred embodiment of a display apparatus comprising a de-interlacing circuit in accordance with the present invention.

A possible architecture of this invention is presented in FIG. 3. For stationary image parts containing dominant vertical edges or low frequencies, the output of the VT median is likely to be equal to the sample $F(\vec{x},n-1)$, and therefore, either of the two is selected as the output. For stationary image parts containing high vertical frequencies, the VT median introduces alias by resulting in either $F(\vec{x} - \vec{u}_y, n)$ or $F(\vec{x} + \vec{u}_y, n)$. However, the output of the linear vertical-temporal filter, $F_{VT}(\vec{x},n)$, will resemble $F(\vec{x},n+1)$. Therefore, either of these two samples is selected as the output sample, preserving vertical detail.

For moving image parts, $F(\vec{x},n-1)$ will generally be an outlier in the VT median. Since the linear vertical-temporal filter applies a weighted filtering of the neighboring samples also, it is likely that $F_{VT}(\vec{x},n)$ and the output of the inner median have about similar sample values. Therefore, in case of motion, either line repetition or linear vertical temporal filtering results.

A somewhat simplified variant of the de-interlacer as mentioned in equation 1 uses two fields only, and is defined by:

$$F_0(\vec{x}, n) = \begin{cases} F(\vec{x}, n), & (y \bmod 2 = n \bmod 2) \\ MED\{A, MED\{B, A, C\}, F_{VT}(\vec{x}, n)\}, & \text{(otherwise)} \end{cases} \quad (6)$$

The quality performance of this algorithm is somewhat less compared to the one of equation 1. The main difference can be observed for vertical moving objects containing vertical detail.

So far, the result is a non-MC de-interlacing method, however, the proposed algorithm can easily be adapted to apply motion compensation, e.g.:

$$F_0(\vec{x}, n) = \begin{cases} F(\vec{x}, n), & (y \bmod 2 = n \bmod 2) \\ MED\{F(\vec{x} + \vec{d}(\vec{x}, n), n + 1), \\ MED\{B, A, C\}, F_{VT}(\vec{x}, n)\}, & \text{otherwise} \end{cases} \quad (7)$$

with $\vec{d}$ the motion vector. Since the motion compensated sample is part of the "fragile" de-interlacing algorithm, the result need not be robust. In other words, since the majority of methods that are input to the median filter are robust, the result will be robust even though motion vectors are being used.

Figure 2:
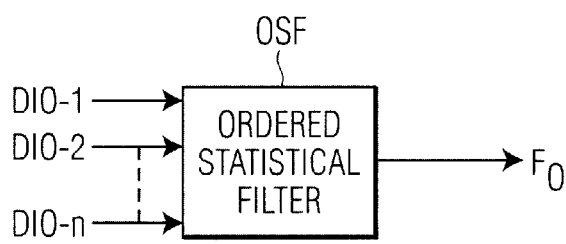
FIG. 2 shows a general architecture of the method according to the invention.

If we generalize the examples shown above, the proposed de-interlacing algorithm is an order statistical filter with multiple inputs from different de-interlacing methods as shown in FIG. 2. FIG. 2 shows a general architecture of the method according to the invention. An ordered statistical filter OSF supplies an interpolated line Fo based on n different de-interlaced outputs DIO-1, DIO-2, . . . , DIO-n obtained by n different de-interlacing methods. If n>3, the de-interlacing methods need not be all different. A majority of the de-interlacing methods is strong on a first quality aspect (e.g., edge preservation). Another majority is strong on a second quality aspect (e.g., detail preservation), and so on. Since the order statistical filter selects the input belonging to the overall majority, the resulting de-interlacing algorithm combines the strengths of the input algorithms.

FIG. 3 shows a preferred embodiment of a display apparatus comprising a de-interlacing circuit in accordance with the present invention. An input image signal F is applied to a first field memory FM1, an output of which is coupled to a second field memory FM2. Inputs of cache memories CM1, CM2 and CM3 are connected to the input of the field memory FM1 and to the outputs of the field memories FM1 and FM2, respectively. The cache memory CM1 supplies the sample A from field n+1 to a first median filter MED1, while the cache memory CM2 supplies the samples B and C to the first median filter MED1. Outputs of the cache memories CM1 and CM2 are coupled to respective inputs of a vertical-temporal filter VTF. A second median filter MED2 receives the sample D from field n−1 from the cache memory CM3, the median of A, B and C from the first median filter MED1, and a filter output $F_{VT}$ from the vertical-temporal filter FVT, to supply the interpolated line E. The cache memory CM2 outputs the original line F. An insertion circuit IC inserts the interpolated lines E between the original lines F to obtain a display signal Fo that is displayed by a display device DD.

A preferred aspect of the invention can be summarized as follows. De-interlacing is the process required to convert interlaced video into a progressive format. Many algorithms, including high performance motion compensated methods and low cost solutions are available from the literature. Preferably, a set of simple de-interlacing algorithms is used, which is chosen in such a manner, that a majority of the algorithms is robust, another majority is good in edge preservation, and a third majority is strong in detail preservation. Although non of these algorithms is good in all aspects, the output of a median filter that selects between these alternatives is, simply because the majority wins. Unique in this new design is the fact that motion vectors can be applied to improve its performance, even if the reliability of these vectors is very poor. In case no vectors are being used the method outperforms all known non-motion compensated methods.

Preferred aspects of the invention provide a method, and an apparatus realizing this method, for de-interlacing video data, characterized in that the interpolated pixels are calculated with an order statistical filter using at its input the N outputs of a number of N de-interlacers, where different majorities of these algorithms share individual strengths, and there exist no majority of de-interlacing algorithms that copy a single spatio-temporally neighboring pixel to the interpolated position.

Preferably, N=3 and the order statistical filter has the following inputs: the output of a first de-interlacing algorithm that is strong on a first and a second criterion (e.g. robustness and edge preservation), but weak on a third criterion (e.g., detail preservation), and the output of a second de-interlacing algorithm that is strong on the first and the third criterion (e.g. robustness and detail preservation), and weak on the second criterion the output of third de-interlacing algorithm that is strong on the second and the third criterion, but weak on the first.

Advantageously, the order statistical filter is a median filter.

Preferably, the first de-interlacing algorithm is a vertical-temporal median filter.

Preferably, the third de-interlacing algorithm is a (motion compensated) field insertion, inserting either a pixel from the previous or from the next input video field.

Preferably, the second de-interlacing algorithm is a linear vertical-temporal filter.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware.

LIST OF REFERENCES

[1] *Preliminary data sheet of Genesis gmVLD8, 8 bit digital video line doubler, version* 1.0, June.

[2] G. de Haan and E. B. Bellers. De-interlacing: an overview. *The proceedings of the IEEE,* 86(9): 1837–1857, September 1998.

[3] P. Haavisto, J. Juhola, and Y. Neuvo. Scan rate up-conversion using adaptive weighted median filtering. *Signal Processing of HDTV, II, L. Chiariglione,* pages 703–710, 1990.

[4] C. Hentschel. High quality noise insensitive motion detector using one field memory. *IEEE Tr. on Consumer Electronics,* 42(3): 696–704, August 1996.

[5] Y. Kim and Y. Cho. Motion adaptive de-interlacing algorithm based on wide vector correlations. In *Proc. of HDTV Workshop '95,* pages 8B9–8B16, 1995.

[6] R. Simonetti, S. Carrato, G. Ramponi, and A. Polo Filisan. De-interlacing for hdtv images for multimedia applications. *Signal Processing of HDTV, IV, E. Dubois and L. Chiariglione, Eds.,* pages 765–772, 1993.

What is claimed is:

1. A method of de-interlacing video data, the method comprising the steps:

applying at least three different de-interlacing algorithms on the video data to obtain at least three de-interlaced signals, no majority of de-interlacing algorithms copying a single spatio-temporally neighboring pixel to the interpolated position; and order statistical filtering the at least three de-interlaced signals to obtain an output signal.

2. The method as claimed in claim 1, wherein the order statistical filtering step comprises median filtering.

3. The method as claimed in claim 1, wherein at least one of said de-interlacing algorithms comprises vertical-temporal median filtering.

4. The method as claimed in claim 1, wherein one of said de-interlacing algorithms comprises field insertion including inserting either a pixel from a previous field or a pixel from a next input video field.

5. The method as claimed in claim 4, wherein said field insertion is motion-compensated.

6. The method as claimed in claim 1, wherein at least one of said de-interlacing algorithms comprises linear vertical-temporal filtering.

7. The method as claimed in claim 1, wherein at least one of said de-interlaced signals is motion-compensated.

8. A device for de-interlacing video data, the device comprising:

means for applying at least three different de-interlacing algorithms on the video data for forming at least three de-interlaced signals, no majority of de-interlacing algorithms copying a single spatio-temporally neighboring pixel to the interpolated position; and means for order statistical filtering the at least three de-interlaced signals to obtain an output signal.

9. A display apparatus, comprising:

a device for de-interlacing video data as claimed in claim 8, to obtain interpolated data;

an insertion circuit for inserting the interpolated data into the video data to obtain a display signal; and a display device for displaying the display signal.

* * * * *